(12) United States Patent
Lee

(10) Patent No.: US 7,963,689 B2
(45) Date of Patent: Jun. 21, 2011

(54) LED-EDGELIT LIGHT GUIDE FIXTURE HAVING LED RECEIVING GROOVES

(75) Inventor: Cheng Sheng Lee, Lujhou (TW)

(73) Assignee: Kun Dian Photoelectric Enterprise Co., Taipei County (TW)

( * ) Notice: Subject to any disclaimer, the term of this patent is extended or adjusted under 35 U.S.C. 154(b) by 0 days.

(21) Appl. No.: 11/976,449

(22) Filed: Oct. 24, 2007

(65) Prior Publication Data

US 2010/0135012 A1    Jun. 3, 2010

(51) Int. Cl.
F21V 7/09         (2006.01)
F21V 7/22         (2006.01)

(52) U.S. Cl. ........ 362/624; 362/612; 362/555; 362/245; 362/511; 362/311.02

(58) Field of Classification Search ................... 362/555, 362/602, 551, 606–613, 615–629, 561, 97.1–97.4, 362/26–27, 241–248, 330, 347, 334–340, 362/326–329, 311.02, 308–310, 511, 520–522; 385/146
See application file for complete search history.

(56) References Cited

U.S. PATENT DOCUMENTS

| 2,347,665 | A  | * | 5/1944  | Christensen et al. ........... 40/363 |
| 4,909,604 | A  | * | 3/1990  | Kobayashi et al. ............. 349/64 |
| 5,136,483 | A  | * | 8/1992  | Schoniger et al. ............ 362/545 |
| 5,365,411 | A  | * | 11/1994 | Rycroft et al. .................. 362/20 |
| 5,555,160 | A  | * | 9/1996  | Tawara et al. ................. 362/613 |
| 5,590,945 | A  | * | 1/1997  | Simms ........................... 362/623 |
| 5,618,096 | A  | * | 4/1997  | Parker et al. .................. 362/629 |
| 2002/0024803 | A1 | * | 2/2002  | Adachi et al. ................... 362/31 |
| 2003/0095399 | A1 | * | 5/2003  | Grenda et al. .................. 362/30 |
| 2004/0114342 | A1 | * | 6/2004  | Lin et al. .......................... 362/31 |
| 2004/0223314 | A1 | * | 11/2004 | Ching-Huang et al. ........ 362/31 |
| 2005/0201120 | A1 | * | 9/2005  | Nesterenko et al. .......... 362/609 |
| 2006/0007704 | A1 | * | 1/2006  | Mori et al. ..................... 362/613 |
| 2006/0171168 | A1 | * | 8/2006  | Cheng et al. .................. 362/628 |
| 2007/0070623 | A1 | * | 3/2007  | Laski ............................. 362/235 |
| 2007/0127261 | A1 | * | 6/2007  | An et al. ....................... 362/608 |
| 2008/0013333 | A1 | * | 1/2008  | Koizumi et al. .............. 362/511 |
| 2008/0210154 | A1 | * | 9/2008  | Nakano et al. ................ 116/288 |

* cited by examiner

*Primary Examiner* — Ismael Negron
(74) *Attorney, Agent, or Firm* — Guice Patents PLLC

(57) ABSTRACT

A LED lighting fixture includes a cavity receiving a light guide board, and a plurality of LEDs mounted within two reinforcing parallel grooves formed in the light guide board along the length of corresponding opposite lateral sides. The light guide board further includes a clear base portion made of a light transmissive material, and a continuous reflective layer disposed over a surface of the clear base portion, the reflective layer having a portion protruding into the clear base portion. Light from the LEDs is injected transversely into the inside of the light guide board for reflection by the reflective layer to be ejected from the lighting fixture through a surface of the light guide board.

6 Claims, 11 Drawing Sheets

LED-EDGELIT LIGHT GUIDE FIXTURE HAVING LED RECEIVING GROOVES

BACKGROUND OF THE INVENTION

1. Field of the Invention

The present invention relates to lighting fixtures and more specifically, to a LED lighting fixture, which uses a light guide board having a reflective layer covering a surface and having a portion protruding into the light guide board to guide light from LEDs so as to increase the angle of illumination and to provide a uniform lighting effect having an enhanced brightness without multi-image and flashing.

2. Description of the Related Art

The history of lamp extends for long. Since the invention of lamp to produce light, it greatly improves the living style of people. Nowadays, a variety of lighting fixtures of different outer appearances have been disclosed for different purposes. Because of heavy market demand, improvements on function as well as on application should never stop.

Despite of different design changes, conventional lighting fixtures use a lamp bulb or lamp tube to produce light. These conventional lighting fixtures have the common drawbacks of high consumption of electric energy and production of heat. The production of heat greatly not only shortens the service life of the lighting fixture but also increases the ambient temperature. Further, a daylight lamp causes a flashing problem that is harmful to the eyes.

Nowadays, LEDs (light emitting diodes) have been intensively used in lighting fixtures to substitute for conventional lamp bulbs and tubes for the advantages of low power consumption and long service life. Further, because LEDs do not contain mercury, using LEDs for lighting fixture brings no harm to environment.

However, LEDs may be too dim in bright light situations because of its unidirectional lighting feature. Therefore, a LED lighting fixture has the drawback of limited angle of illumination. To overcome this problem, multiple LEDs may be arranged together and set in different angles. However, this arrangement greatly complicates the fabrication of the lighting fixture and will also increase the cost. Further, a lighting fixture constructed according to this arrangement may produce multiple images, not practical to substitute for conventional daylight lamps.

Taiwan Patent Publication No. M306666 discloses a light guide structure for lighting fixture, which is an invention of the present inventor. According to this design, the light guide structure comprises a light guide board made of a transmissive material having a clear transmissive layer, and a reflective layer covered on the back side of the light guide board. The reflective layer has an arched convex portion on the middle (see claim 7). The light guide structure is used with a lateral light source to construct a lighting fixture that increases the angle of illumination, provides a uniform lighting effect with enhanced brightness, and eliminates the multi-image and flashing problems of conventional daylight lamps.

However, the design of the arched convex portion of the reflective layer still has a limitation in reflection. Therefore, there is still a room for improvement.

SUMMARY OF THE INVENTION

The present invention has been accomplished under the circumstances in view. It is the main object of the present invention to provide a LED lighting fixture formed of a light guide board and a set of LEDs, which has a curved reflective layer provided at the light guide board to produce a satisfactory reflection effect, thereby effectively increasing the angle of illumination, providing a uniform lighting effect with enhanced brightness, and eliminating the multi-image and flashing problems of conventional daylight lamps.

To achieve this and other objects of the present invention, the LED lighting fixture comprises a cavity directly formed in a lamp holder, furniture, utensil, or the construction of a building, a light guide board, and a plurality of LEDs (light emitting diodes). The light guide board is made of a high transmissive material, comprising a clear base layer at the front side and a continuous piece of reflective layer at the back side. The reflective layer is disposed over a surface of the clear base layer and has a portion protruding into the clear base layer. The LEDs are mounted within the cavity outside the light guide board, and adapted to emit light transversely into the inside of the light guide board for reflection by the reflective layer to increase the angle of illumination and to provide a uniform lighting effect having an enhanced brightness without causing multi-image and flashing.

DETAILED DESCRIPTION OF THE PREFERRED EMBODIMENT

Figure 1:
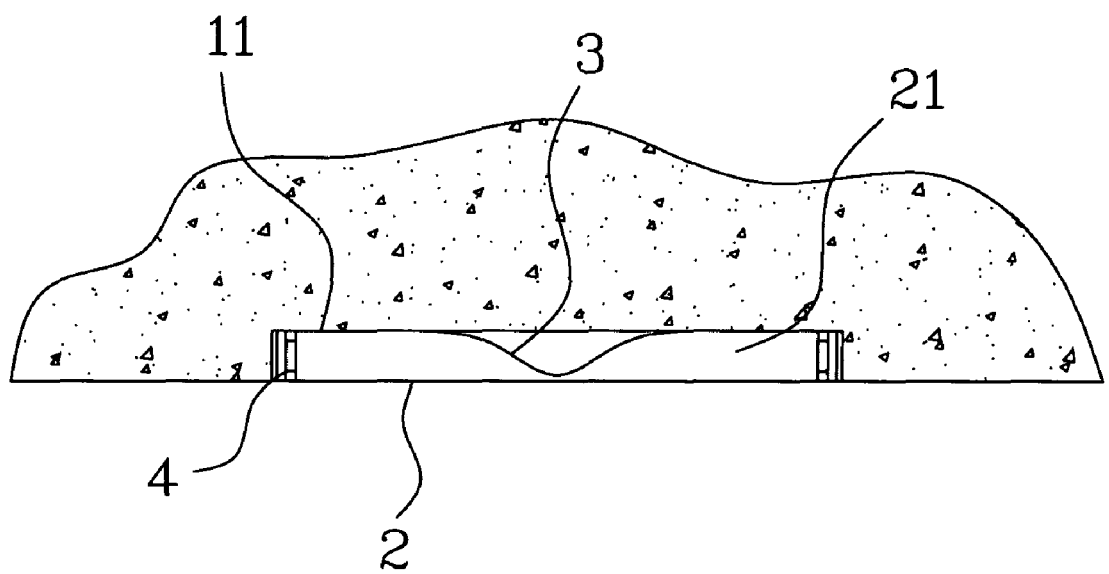
FIG. 1 is a schematic plain view of a LED lighting fixture in accordance with the first embodiment of the present invention.
Figure 2:
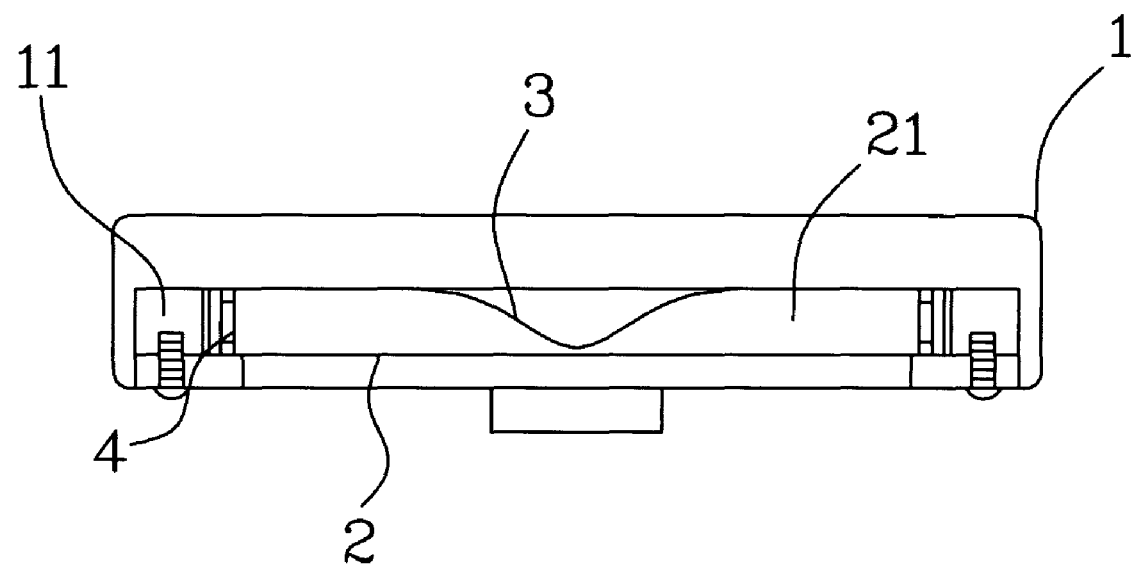
FIG. 2 is a schematic plain view of the first embodiment of the present invention, showing the lighting fixture installed in the cavity of a lamp holder.
Figure 3:
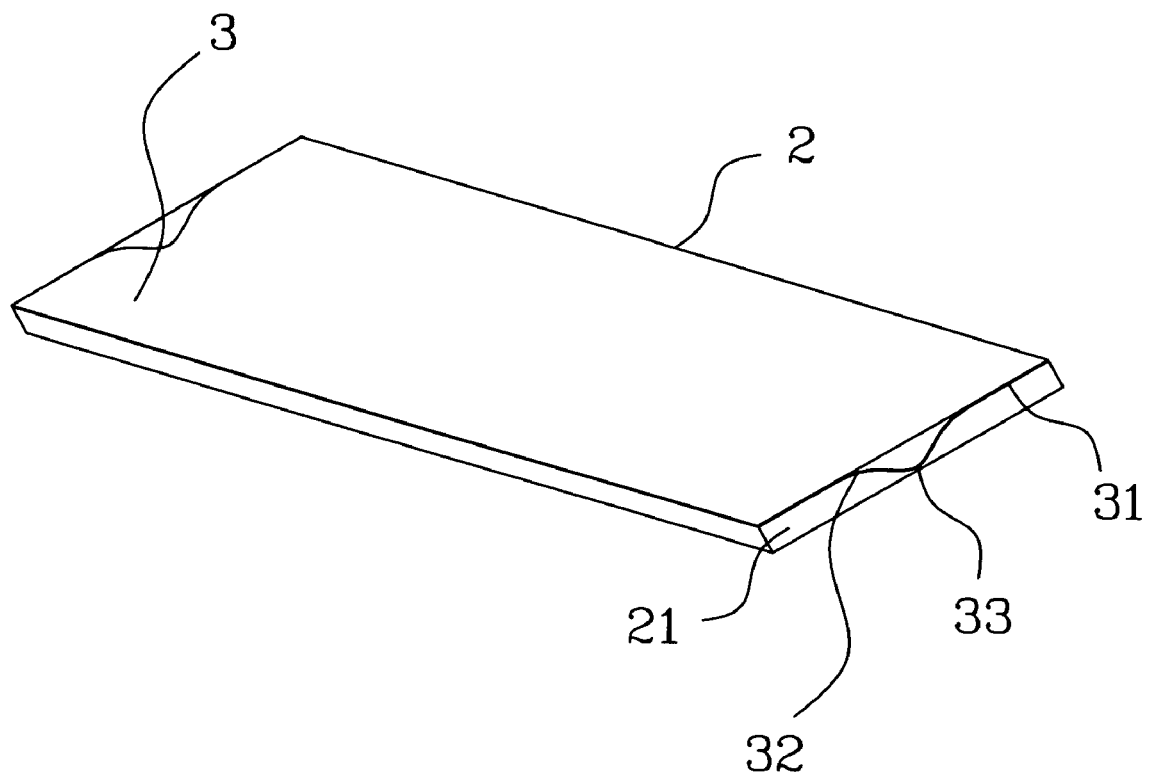
FIG. 3 is an elevational view of a light guide board for the LED lighting fixture in accordance with the first embodiment of the present invention.
Figure 4:
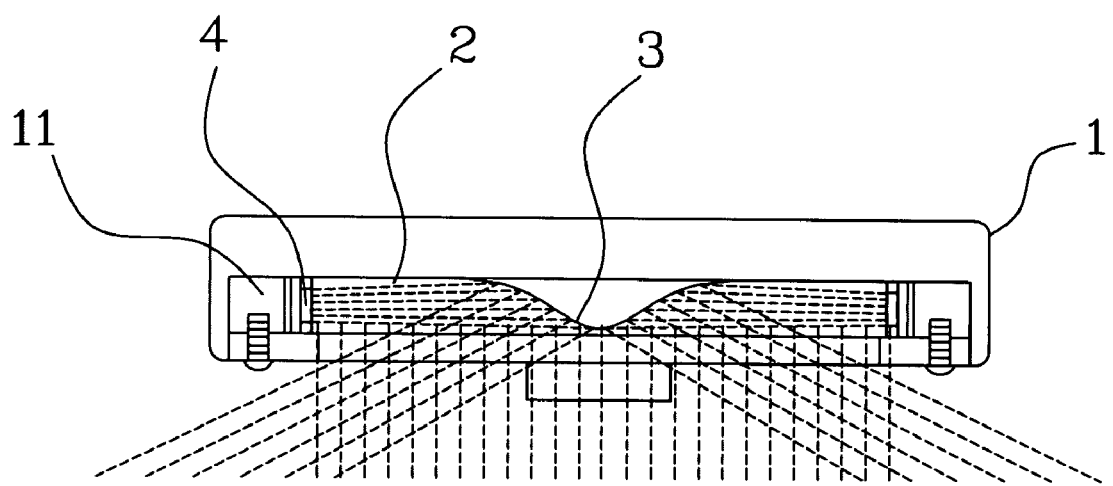
FIG. 4 is a schematic drawing showing an application example of the LED lighting fixture in accordance with the first embodiment of the present invention.
Figure 5:
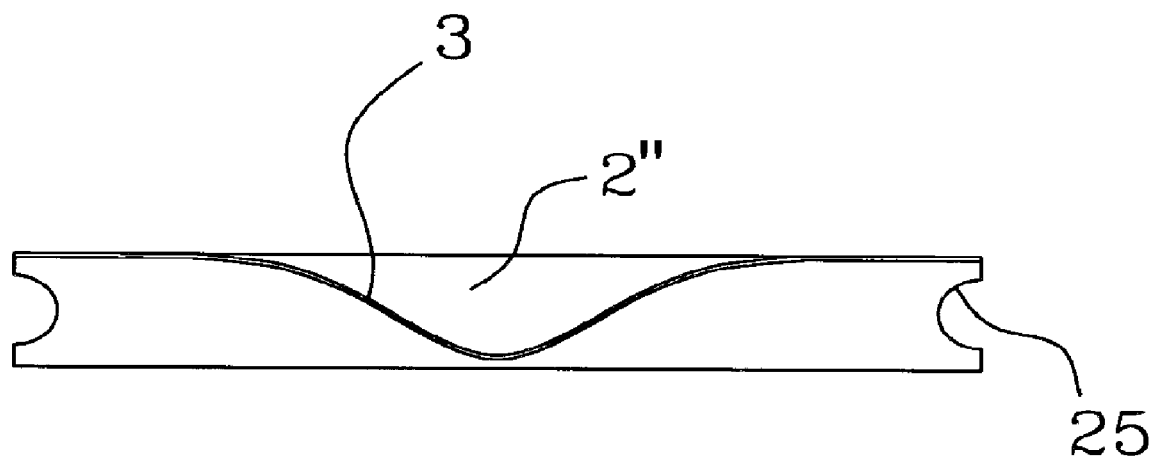
FIG. 5 is a plain view of a part of the first embodiment of the present invention, showing the clear base layer of the light guide board provided with reinforcing grooves.
Figure 6:
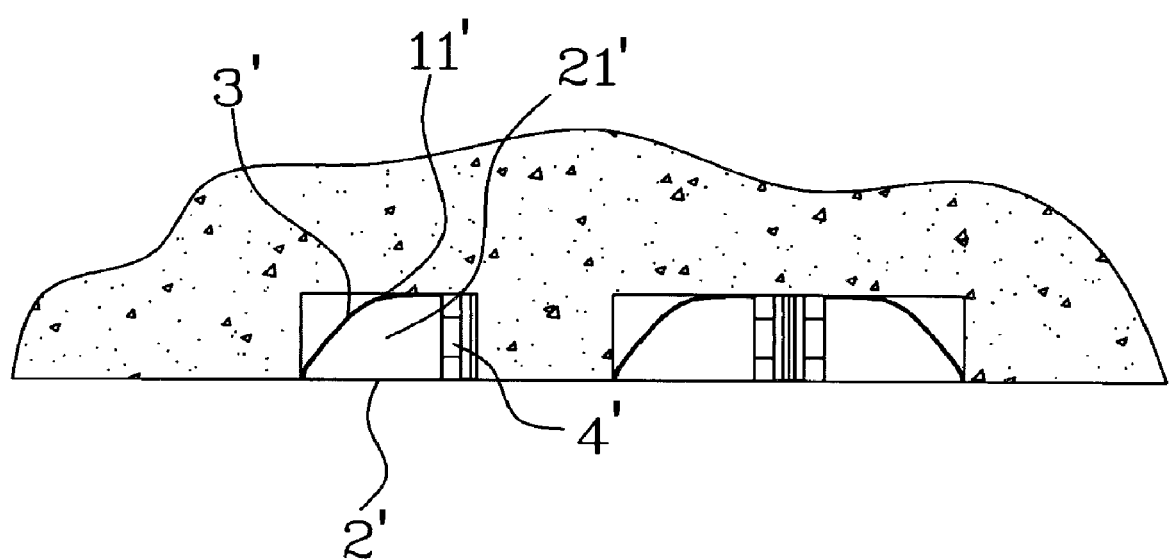
FIG. 6 is a schematic plain view of a LED lighting fixture in accordance with a second embodiment of the present invention.
Figure 7:
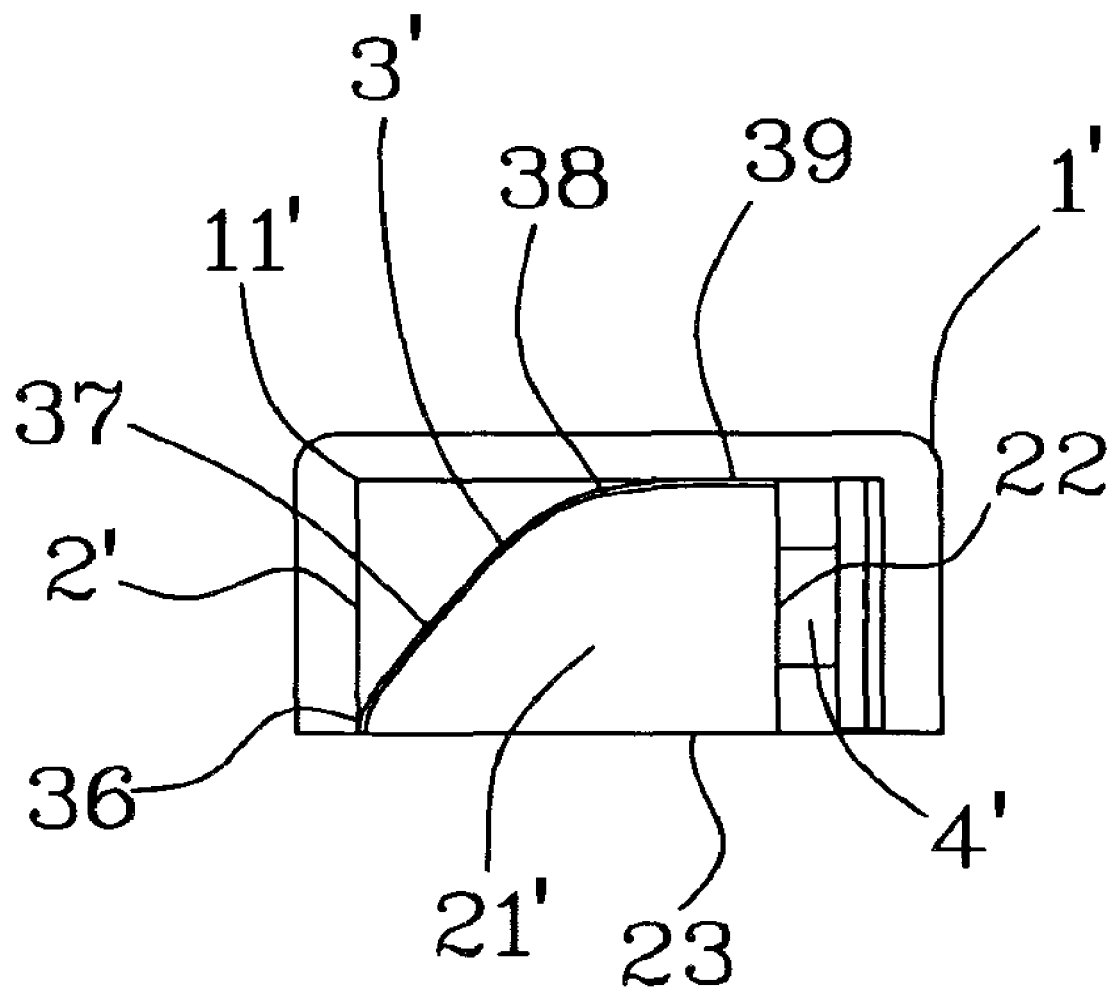
FIG. 7 is a schematic plain view of the second embodiment of the present invention, showing the lighting fixture installed in the cavity of a lamp holder.
Figure 8:
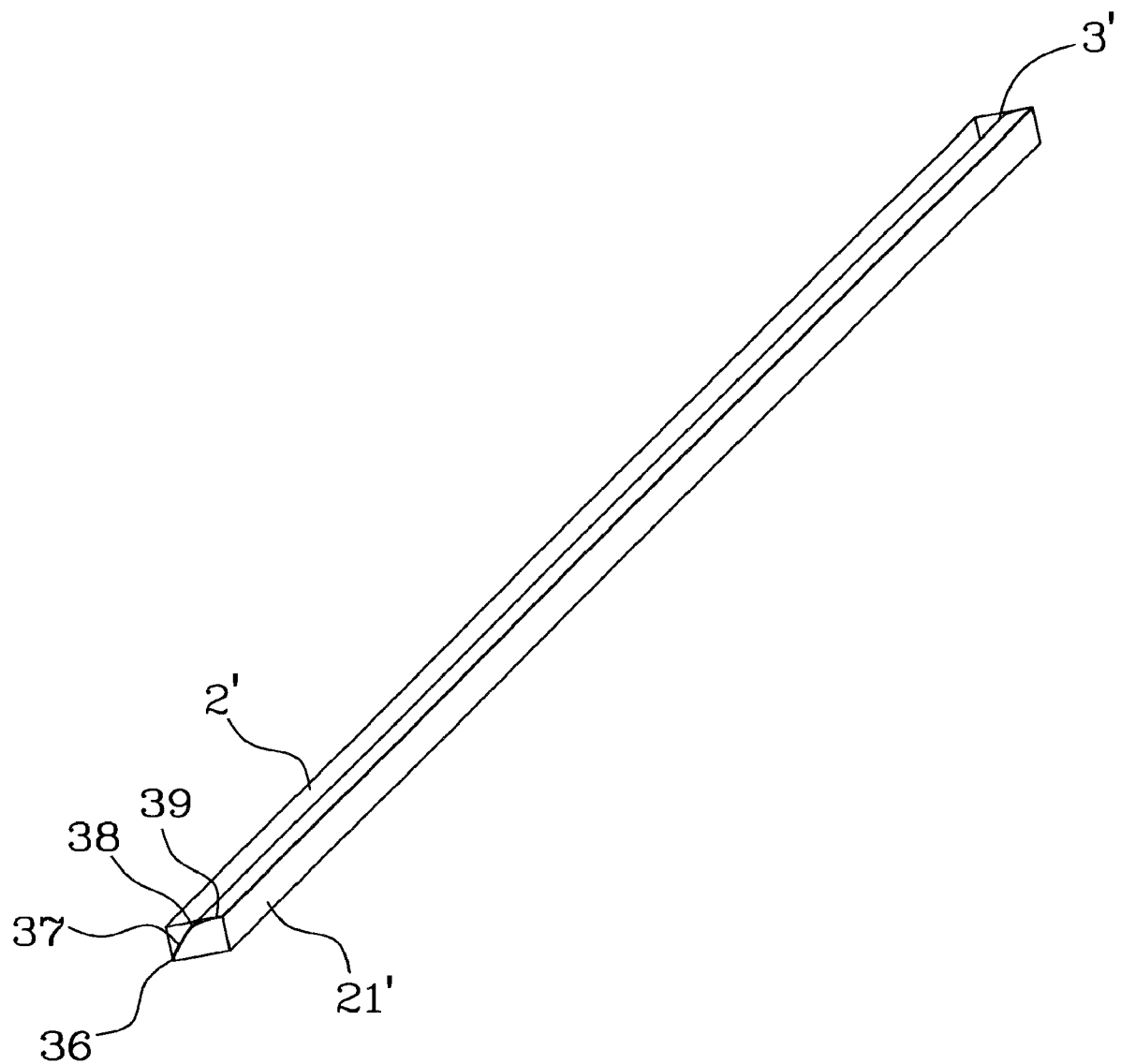
FIG. 8 is a perspective view of a light guide board for the LED lighting fixture in accordance with the second embodiment of the present invention.
Figure 9:
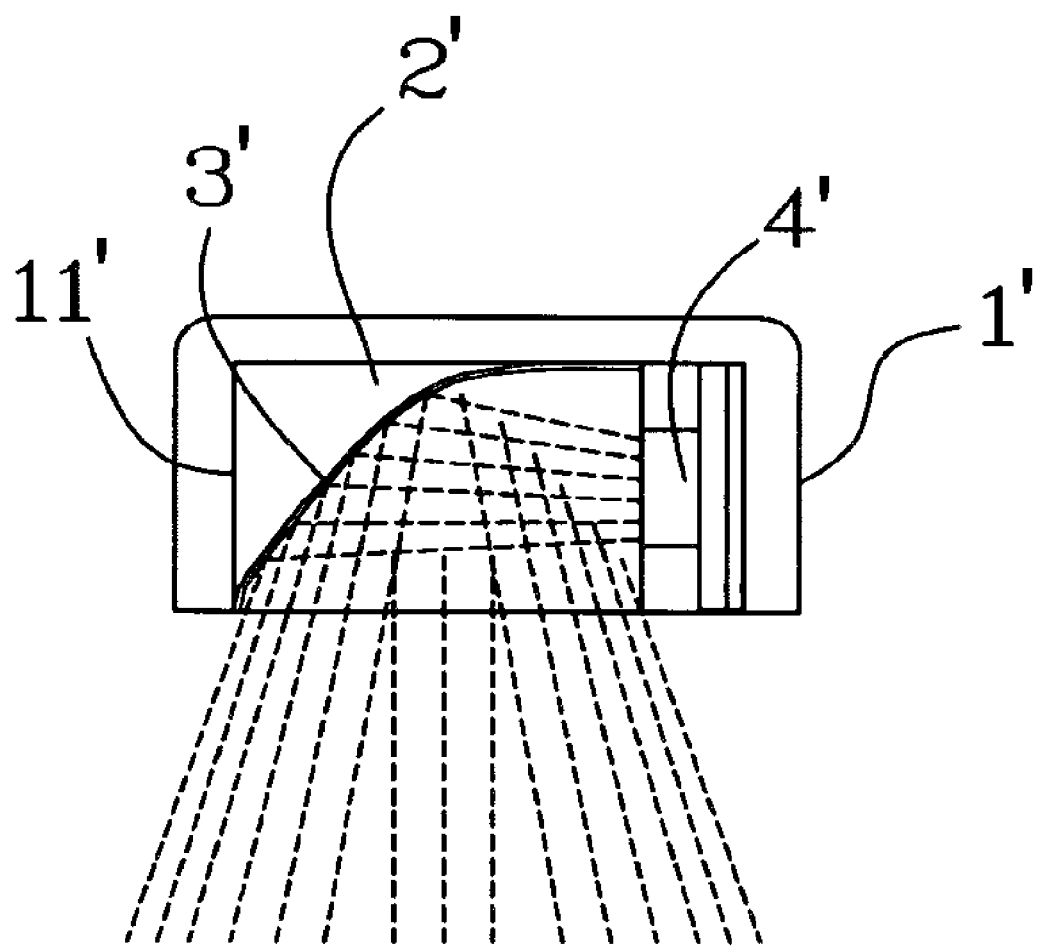
FIG. 9 is a schematic drawing showing an application example of the LED lighting fixture in accordance with the second embodiment of the present invention.
Figure 10:
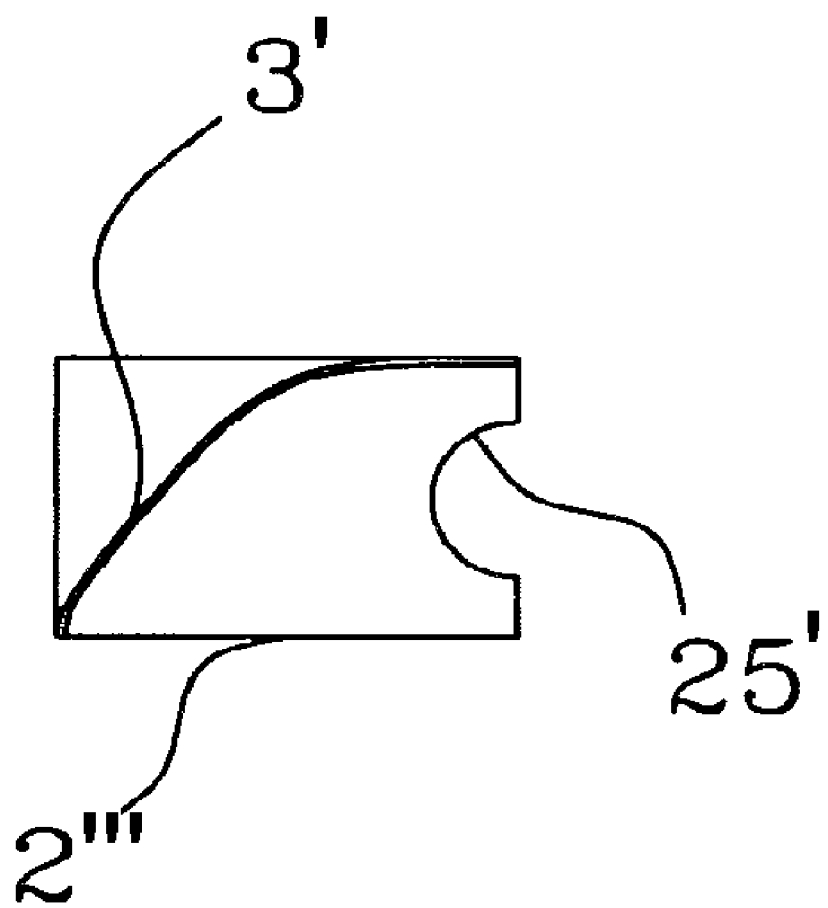
FIG. 10 is a plain view of a part of the second embodiment of the present invention, showing the clear base layer of the light guide board provided with a reinforcing groove.

Referring to FIGS. 1~5, a LED lighting fixture in accordance with a first embodiment of the present invention is shown comprising a cavity 11, a light guide board 2, and a plurality of LEDs (light emitting diodes) 4.

The cavity 11 may be directly formed in a lamp holder 1, a piece of furniture, a utensil, or the construction of a building.

The light guide board 2 is made of a high transmissive material and mounted inside the cavity 11, having a clear base portion 21 at its front side a continuous piece of reflective layer 3 at its back side. The cross section of the reflective layer 3 shows a portion protruding into the clear base portion 21. Further, the reflective layer 3 has two straight end edges 31, two arched shoulder portions 32 respectively extended from the two straight end edges 31 on the middle and respectively terminating in a V-shaped tip 33.

The LEDs 4 are mounted within the cavity 11 outside the light guide board 2, and adapted to emit light transversely into the inside of the light guide board 2 from two opposite lateral sides.

Referring to FIGS. 2-4 again, when the LED lighting fixture is turned on, the LEDs 4 emit light toward the inside of the light guide board 2 from two opposite lateral sides. When light rays go through the light guide board 2, the straight end edges 31, arched shoulder portions 32, and V-shaped tips 33 of the reflective layer 3 reflect the light rays from the LEDs 4 in different directions, increasing the angle of illumination, providing a uniform lighting effect and enhancing the brightness and eliminating the multi-image and flashing problems of the prior art design.

Referring to FIGS. 2 and 5 again, the light guide board 2" can be made having two reinforcing grooves 25 respectively disposed on the two opposite lateral side edges and extending along the length to reinforce the structural strength, preventing deformation of the light guide board 2" during installation. Further, during installation of the LED lighting fixture, the LEDs 4 can be inserted into the reinforcing grooves 25, so that light rays from the LEDs 4 directly go through the light input surface 22 toward the reflective layer, eliminating light leakage and obtaining the best lighting effect.

Referring to FIGS. 6~10, a LED lighting fixture in accordance with a second embodiment of the present invention is shown comprising a cavity 11', a light guide board 2', and a plurality of LEDs (light emitting diodes) 4'.

The cavity 11' may be directly formed in a lamp holder 1', a piece of furniture, a utensil, or the construction of a building.

The light guide board 2' is made of a high transmissive material and mounted inside the cavity 11', having a clear base portion 21' at its front side a continuous piece of reflective layer 3' at its back surface. The clear base portion 21' of the light guide board 2' has a light input surface 22 disposed at one lateral side, and a light output surface 23 disposed at the front side and abutted against the light output surface 23 at an angle. The reflective layer 3' has a portion protruding into the clear base portion 21', and an inner side bonded to the whole surface area of said clear base portion 21' beyond the light input surface 22 and the light output surface 23. The inner side of the reflective layer 3' that is bonded to the clear base portion 21' has a flat base portion 39 disposed close to the light source (the LEDs 4'), a curved tail portion 36 abutted against one side of the light output surface 23 opposite to the light input surface 22, a sloping portion 37 connected between the flat base portion 39 and the tail portion 36, and a great arched portion 38 connected between the flat base portion 39 and the sloping portion 37. The sloping portion 37 and the great arched portion 38 of the reflective layer are located within the light guide board 2' between the back surface, the light output surface, the light input surface, and a second side surface of the clear base portion 21'.

The LEDs 4' are mounted within the cavity 11' outside the light guide board 2', and adapted to emit light through the light input surface 22 into the inside of the light guide board 2'.

Referring to FIGS. 7-9 again, when the LED lighting fixture is turned on, the LEDs 4' emit light through the light input surface 22 into the inside of the light guide board 2'. When light rays go through the light input surface 22 into the inside of the light guide board 2', the incident light rays are reflected by the flat base portion 39, the great arched portion 38, the sloping portion 37 and the tail portion 36 in different angles toward the outside of the light guide board 2' and the cavity 11' through the light output surface 23 to increase the angle of illumination, thereby providing a uniform lighting effect and enhancing the brightness and eliminating the multi-image and flashing problems of the prior art design.

Referring to FIGS. 6 and 10 again, the light guide board 2''' can be made having a reinforcing groove 25' formed on and extending along the length of its one side to reinforce the structural strength of the light guide board 2''' against deformation. Further, during installation of the LED lighting fixture, the LEDs 4' can be inserted into the reinforcing groove 25', so that light rays from the LEDs 4' directly go through the light input surface 22 toward the reflective layer, eliminating light leakage and obtaining the best lighting effect.

Figure 11:
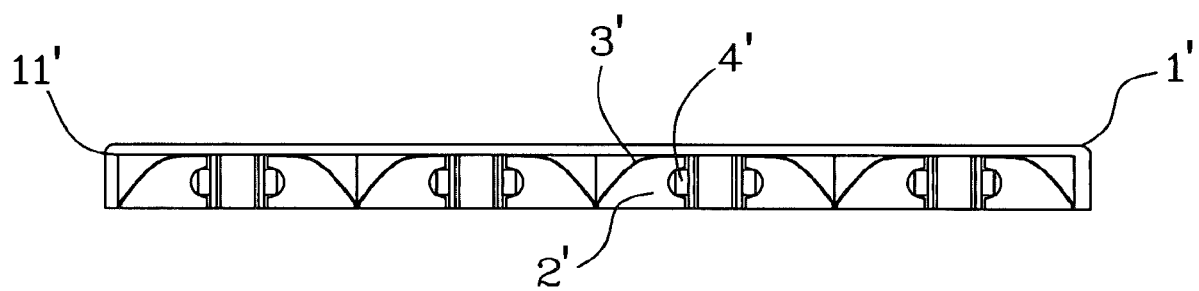
FIG. 11 is a schematic plain view of the second embodiment of the present invention, showing multiple LED lighting fixtures arranged in parallel in one single cavity according to the present invention.

Further, as shown in FIG. 11, it is to be understood that the arrangement of this new structure is for single-side illumination. Therefore, the structure can be made relatively greater to replace for a daylight lamp, i.e., multiple sets can be arranged in parallel in one same cavity 11' or lamp holder 1' for use to substitute for a conventional embedded ceiling lamp, providing a satisfactory lighting effect.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A LED lighting fixture comprising:
   a cavity;
   a light guide board mounted inside said cavity, said light guide board having a base portion made of a light transmissive material and including a front surface, a back surface, a first side surface and a second side surface, the first side surface is a light input surface, and the front surface is a light output surface abutted against the light input surface at an angle, the light guide board further having a reflective layer disposed over the back surface of the base portion and including a section portion protruding into the base portion and an inner side bonded to the whole surface area of said base portion beyond said light input surface and said light output surface, the inner side of the reflective layer comprising a flat base portion disposed on the back surface and abutted to one side of said light input surface, a curved tail portion abutted against the second side surface adjacent to one side of said light output surface opposite to said light input surface, a sloping portion connected between said flat base portion and said tail portion, and a great arched portion connected between said flat base portion and said sloping portion, the sloping portion and the great arched portion of the reflective layer are located within the light guide board between the back surface, the light output surface, the light input surface, and the second side surface; and
   a plurality of light emitting diodes mounted within said cavity and along an exterior surface of said light input surface of said light guide board, light from the plurality of light emitting diodes is injected into the inside of the light guide board through the light input surface, reflected by the reflecting layer and ejected from the LED Fixture through the light output surface of the light guide board.

2. The LED lighting fixture as claimed in claim 1, wherein said base portion of said light guide board comprises a reinforcing groove extending along a length of said light input surface.

3. The LED lighting fixture as claimed in claim 1, wherein said cavity accommodates parallel sets of light guide boards and light emitting diodes, the parallel sets of light guide boards and light emitting diodes are located in a common plane.

4. A LED lighting fixture comprising:

a lamp holder, said lamp holder defining therein a cavity;

a light guide board mounted inside said cavity, said light guide board having a base portion made of a light transmissive material and including a front surface, a back surface, a first side surface and a second side surface, the first side surface is a light input surface, and the front surface is a light output surface abutted against the light input surface at an angle, the light guide board further having a reflective layer disposed over back surface of the base portion and including a section portion protruding into the base portion and an inner side bonded to the whole surface area of said base portion beyond said light input surface and said light output surface, the inner side of the reflective layer comprising a flat base portion disposed on the back surface and abutted to one side of said light input surface, a curved tail portion abutted against the second side surface adjacent to one side of said light output surface opposite to said light input surface, a sloping portion connected between said flat base portion and said tail portion, and a great arched portion connected between said flat base portion and said sloping portion, the sloping portion and the great arched portion of the reflective layer are located within the light guide board between the back surface, the light output surface, the light input surface, and the second side surface; and a plurality of light emitting diodes mounted within said cavity and along an exterior surface of said light input surface of said light guide board, light from the plurality of light emitting diodes is injected into the inside of the light guide board through the light input surface, reflected by the reflecting layer and ejected from the LED Fixture through the light output surface of the light guide board.

5. The LED lighting fixture as claimed in claim 4, wherein said base portion of said light guide board comprises a reinforcing groove extending along a length of said light input surface.

6. The LED lighting fixture as claimed in claim 4, wherein said cavity accommodates parallel sets of light guide boards and light emitting diodes, the parallel sets of light guide boards and light emitting diodes are located in a common plane.

* * * * *